US011761492B2

(12) United States Patent
Yoshinaga (10) Patent No.: US 11,761,492 B2
(45) Date of Patent: Sep. 19, 2023

(54) BOOT FOR CONSTANT VELOCITY UNIVERSAL JOINT

(71) Applicant: NTN CORPORATION, Osaka (JP)

(72) Inventor: Shingo Yoshinaga, Shizuoka (JP)

(73) Assignee: NTN CORPORATION, Osaka (JP)

( * ) Notice: Subject to any disclaimer, the term of this patent is extended or adjusted under 35 U.S.C. 154(b) by 691 days.

(21) Appl. No.: 16/493,879

(22) PCT Filed: Mar. 14, 2018

(86) PCT No.: PCT/JP2018/010012
§ 371 (c)(1),
(2) Date: Sep. 13, 2019

(87) PCT Pub. No.: WO2018/168941
PCT Pub. Date: Sep. 20, 2018

(65) Prior Publication Data
US 2021/0123481 A1    Apr. 29, 2021

(30) Foreign Application Priority Data

Mar. 16, 2017    (JP) ................................. 2017-051428

(51) Int. Cl.
*F16D 3/84*    (2006.01)
*F16J 3/04*    (2006.01)
*F16J 15/52*    (2006.01)

(52) U.S. Cl.
CPC .............. *F16D 3/845* (2013.01); *F16J 3/041* (2013.01); *F16J 15/52* (2013.01); *F16D 2200/0056* (2013.01)

(58) Field of Classification Search
CPC ... F16D 2200/0056; F16D 3/845; F16J 15/52; F16J 3/041
See application file for complete search history.

(56) References Cited

U.S. PATENT DOCUMENTS 6,209,885 B1 *   4/2001   Mukaida ................... F16J 3/043
                                                        277/634
6,227,748 B1 *   5/2001   Hayward .................. F16J 3/042
                                                        403/50

(Continued)

FOREIGN PATENT DOCUMENTS

CN           105299076        2/2016
JP           2002-257152      9/2002

(Continued)

OTHER PUBLICATIONS

International Search Report dated May 29, 2018 in International (PCT) Application No. PCT/JP2018/010012.

(Continued)

*Primary Examiner* — Eugene G Byrd
(74) *Attorney, Agent, or Firm* — Wenderoth, Lind & Ponack, L.L.P.

(57) ABSTRACT

A boot for a constant velocity universal joint includes large- and small-diameter mounting portions to be mounted to an outer joint member and a shaft, respectively, with boot clamps, a bellows portion integrally coupling the large- and small-diameter mounting portions to each other, and a cylindrical shoulder portion formed at a bellows portion-side end of the large-diameter-side mounting portion, and connected to the bellows portion through two auxiliary crest portions and one auxiliary trough portion between the auxiliary crest portions. A radial distance between each of the auxiliary crest portions and the auxiliary trough portion is shorter than a radial distance between a crest portion and a trough portion. A diameter passing through a center of the radial distance between each of the auxiliary crest portions and the auxiliary trough portion is larger than a diameter of the cylindrical shoulder portion.

8 Claims, 10 Drawing Sheets

(56) References Cited

U.S. PATENT DOCUMENTS

| | | | | |
|---|---|---|---|---|
| 6,464,233 | B1* | 10/2002 | Oetiker | F16J 3/042 |
| | | | | 277/637 |
| 2003/0047883 | A1 | 3/2003 | Imazu et al. | |
| 2009/0166987 | A1* | 7/2009 | Shibata | F16D 3/845 |
| | | | | 277/636 |
| 2010/0120546 | A1* | 5/2010 | Suzuki | F16D 3/845 |
| | | | | 464/145 |
| 2010/0160053 | A1* | 6/2010 | Okubo | F16D 3/845 |
| | | | | 464/175 |
| 2011/0256941 | A1* | 10/2011 | Takabe | F16J 3/043 |
| | | | | 464/175 |

FOREIGN PATENT DOCUMENTS

| | | | |
|---|---|---|---|
| JP | 2005-83439 | | 3/2005 |
| JP | 3719177 | | 11/2005 |
| JP | 2006258159 | A * | 9/2006 |
| JP | 2007120580 | A * | 5/2007 |
| JP | 2007-211927 | | 8/2007 |
| JP | 2008-32192 | | 2/2008 |
| JP | 2008-261446 | | 10/2008 |
| JP | 2008291912 | A * | 12/2008 |
| JP | 2009-270628 | | 11/2009 |
| JP | 2010-236566 | | 10/2010 |
| JP | 5363855 | | 12/2013 |
| WO | 2010/079674 | | 7/2010 |

OTHER PUBLICATIONS

Office Action dated May 8, 2021 in Chinese Patent Application No. 201880018025.0, with English-language translation.
International Preliminary Report on Patentability and Written Opinion of the International Searching Authority dated May 29, 2018 in International (PCT) Patent Application No. PCT/JP2018/010012.
Extended European Search Report dated Oct. 30, 2020 in corresponding European Patent Application No. 18768222.4.

* cited by examiner

BOOT FOR CONSTANT VELOCITY UNIVERSAL JOINT

TECHNICAL FIELD

The present invention relates to a boot for a constant velocity universal joint, which is to be mounted to a constant velocity universal joint to be used for an automobile or various types of industrial machines.

BACKGROUND ART

In recent years, in order to increase added value of an automobile, for example, improvement of ability of a vehicle to make quick turns and expansion of a cabin space are increasingly demanded. In order to meet the demands described above, reduction of a minimum turning radius of the vehicle or extension of a wheel base are required. In order to meet the requirements described above, a turning angle of a tire is required to be increased. In a front-wheel-drive vehicle (FF vehicle) or a four-wheel-drive vehicle (4WD vehicle), each having a steering wheel as a drive wheel, a maximum operating angle of a fixed type constant velocity universal joint, which is installed on the drive wheel side in a front drive shaft configured to transmit an engine output from a differential gear to the drive wheel, is requested to be increased.

When the constant velocity universal joint is rotated at a high operating angle, pleats of a bellows of a boot are brought into contact with each other. As a result, there arise problems in, for example, wear and reduction of durability at a contact portion between the pleats due to a difference in peripheral speed, and reduction of durability due to biting of a bellows portion between an outer joint member and the shaft. In order to cope with the problems described above, various shapes of boots have been proposed for the purpose of improvement of the durability when an operating angle of the constant velocity universal joint falls within a high operating angle range (Parent Document 1 to Parent Document 4).

A boot described in Parent Document 1 includes a shoulder portion having a tapered shape with a diameter decreasing toward a small-diameter side. Radially outward protrusion of the shoulder portion at the time of bending of the boot is suppressed to improve a folded shape of the bellows portion to thereby improve the durability. A boot described in Parent Document 2 includes a shoulder portion having an arc shape inwardly projecting toward an outer joint member. A plurality of crests are formed on an outer peripheral surface of the outer joint member so that a contact stress between pleats of a bellows portion or between the bellows portion and an end surface of the outer joint member is reduced to improve durability. Further, biting of the bellows portion between the outer joint member and a shaft is prevented.

In a boot described in Parent Document 3, a shoulder portion is extended in an axial direction of the boot by 5 mm or longer to thereby prevent interference of the shoulder portion with an ear portion of a clamp. A boot described in Parent Document 4 includes a long shoulder portion having two or more crest portions formed thereon. With the crest portions, protruding deformation of the shoulder portion is suppressed to alleviate fatigue and improve durability. Further, an impact force applied by, for example, a flying stone is reduced.

PRIOR ART DOCUMENTS

Patent Documents

Parent Document 1: JP 3719177 B2
Parent Document 2: JP 5363855 B2
Parent Document 3: JP 2007-211927 A
Parent Document 4: JP 2008-261446 A

SUMMARY OF THE INVENTION

Problems to be Solved by the Invention

However, in the boot described in Parent Document 1, when the joint forms a high operating angle, there is a fear in that a trough portion of the boot in the vicinity of an opening portion of the outer joint member may be liable to be caught between the shaft and the outer joint member. As a result, the durability may be reduced. Further, the following is conceivable. In comparison to a cylindrical shoulder portion in the related art, a film length of the boot is reduced because of the tapered shape. As a result, a tensile stress on the trough portions on a tension side is increased, and hence fatigue is liable to be accumulated. In the boot described in Parent Document 2, a size of the boot itself is increased in an axial direction thereof. Further, a mounting position for the clamp is significantly shifted from that of a clamp in a related-art boot to a side opposite to the opening of the outer joint member. Accordingly, at the time of assembly of the drive shaft in the vehicle, a clearance from a peripheral device is reduced, and it is conceivable that problems may arise in degree of freedom in vehicle design and mountability.

In the boot described in Parent Document 3, when a constant velocity universal joint forms a high operating angle, a compression side of the shoulder portion functions as if the shoulder portion was a tension rod. There is a fear in that the clamp may be pressed to come off a large-diameter-side mounting portion of the outer joint member. In the boot described in Parent Document 4, a film length of the boot is insufficient. Thus, there is a fear in that an early fatigue failure may occur due to recess of a crest portion on a tension side or increase in stress on the trough portion when the constant velocity universal joint forms a higher operating angle equal to or higher than an operating angle of an existing item.

The related-art boots described above have various problems when the constant velocity universal joint forms a high operating angle, and it is found that the operating angle of the constant velocity universal joint in the related art cannot reach a maximum operating angle equal to or larger than 50 degrees (hereinafter also referred to as "super high operating angle"), at which the demands in recent years, such as the improvement of ability of the vehicle to make quick turns and the expansion of the cabin space may be met. The present invention has focused on the problems described above.

In view of the problems described above, the present invention has an object to provide a boot for a constant velocity universal joint, which has excellent durability and fatigue resistance even when the constant velocity universal joint forms a super high operating angle.

Solution to the Problems

Figure 6A:
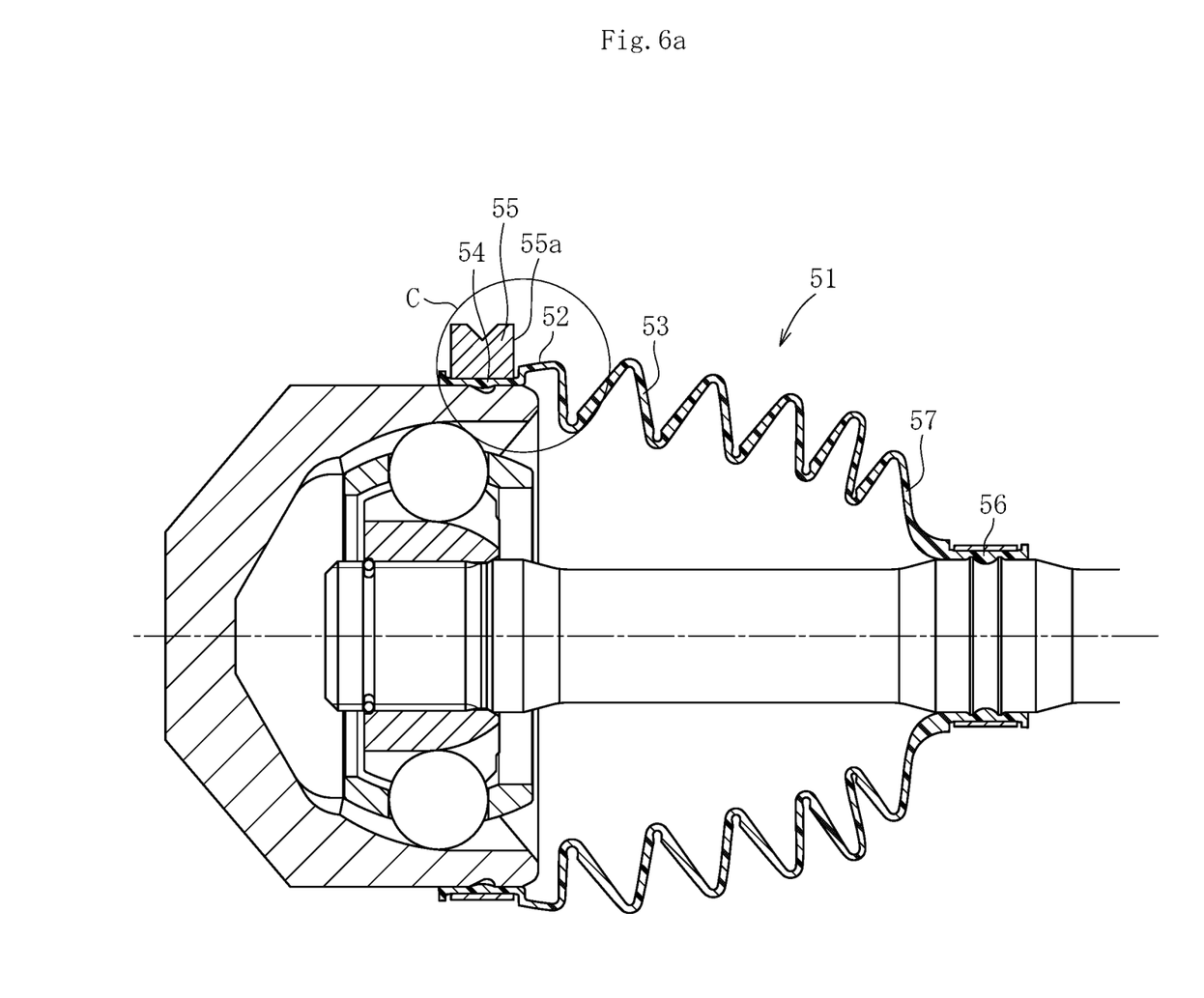
FIG. 6a is a longitudinal sectional view of a boot used in an existing constant velocity universal joint, for illustrating findings in a development process.
Figure 6B:
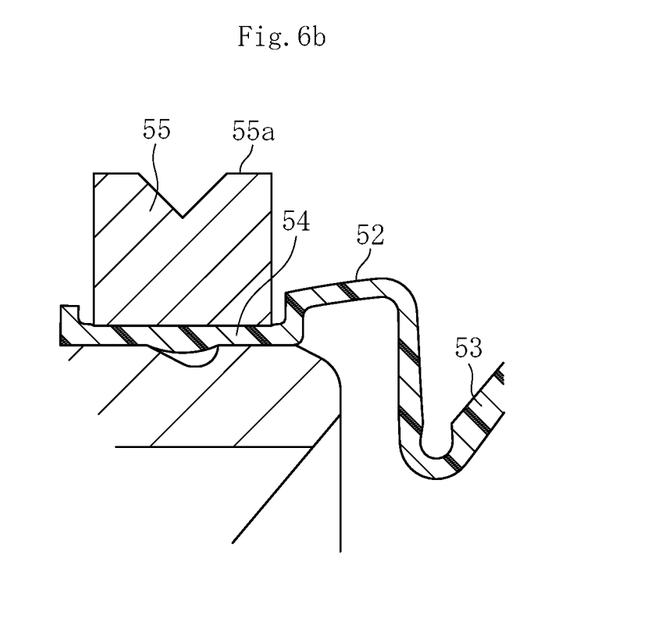
Figure 7A:
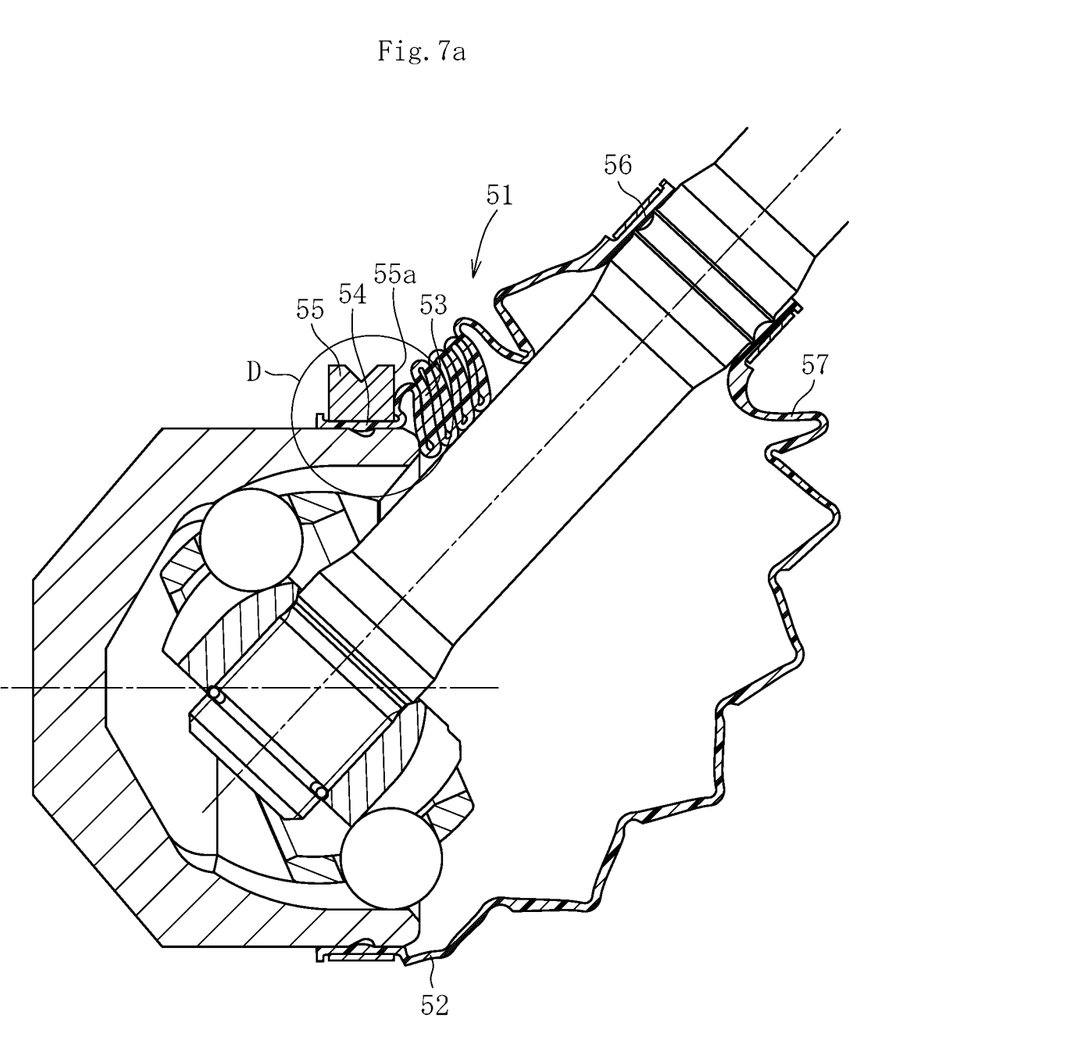
FIG. 7a is a longitudinal sectional view for illustrating a bent state of the boot for a constant velocity universal joint of FIG. 6a when the constant velocity universal joint forms a high operating angle.
Figure 7B:
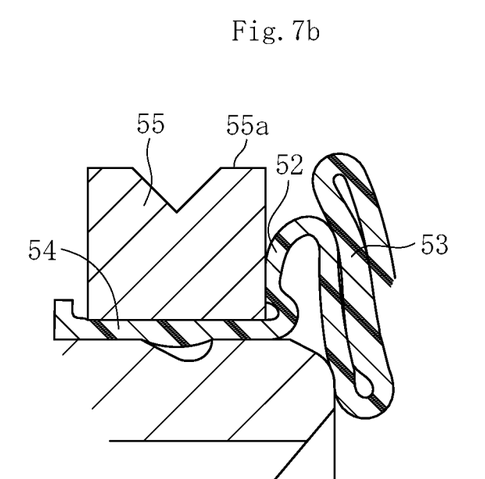

In order to achieve the object described above, the inventor of the present invention has conducted various examinations and verifications on a boot used in an existing constant velocity universal joint having a maximum operating angle equal to or smaller than 50 degrees, which is illustrated in FIG. 6 and FIG. 7. FIG. 6 and FIG. 7 are views for illustrating findings in a development process. FIG. 6a is a longitudinal sectional view of a boot used in an existing constant velocity universal joint, and FIG. 6b is an enlarged longitudinal sectional view of a portion C of FIG. 6a. FIG. 7a is a longitudinal sectional view for illustrating a bent state of the boot for a constant velocity universal joint of FIG. 6a when the constant velocity universal joint forms a high operating angle, and FIG. 7b is an enlarged longitudinal sectional view of a portion D of FIG. 7a. As a result of the examinations and verifications, the following findings has been obtained.

Specifically, as illustrated in FIG. 6a and FIG. 6b, in the boot 51, a shoulder portion 52 of a large-diameter-side mounting portion 54 has a tapered shape that opens radially outward in a direction toward a small-diameter side. When the constant velocity universal joint forms a large operating angle, a compression side of the shoulder portion 52 protrudes in a radial direction of the boot 51 by a large amount. When the constant velocity universal joint forms a larger operating angle, as illustrated in FIG. 7a and FIG. 7b, the shoulder portion 52 is brought into contact with an ear portion 55a of a boot clamp 55 on a large-diameter side, which may sometimes reduce the durability due to wear. Further, a bellows portion 53 is forcibly folded, and hence pleats of the bellows portion 53 may sometimes be brought into contact with each other with a strong force to reduce the durability.

On a tension side, a recess may sometimes be formed on the crest portion because of an insufficient film length of the boot 51, or the durability may sometimes be reduced due to increase in stress applied to the trough portions. Further, on a small-diameter side, when the constant velocity universal joint forms a high operating angle, a curvature radius of a portion 57 (small-diameter-side rising portion) for coupling a small-diameter-side mounting portion 56 and the bellows portion 53 to each other is increased. Thus, a stress applied to the small-diameter-side mounting portion 56 may sometimes be increased to reduce the durability.

The inventor of the present invention has attained the present invention and also an advantageous configuration of the present invention with the following novel ideas based on the above-mentioned findings.

(1) When a constant velocity universal joint forms a super high operating angle, two small crest portions are formed on a large-diameter side. Overlapping of the two small crest portions in a radial direction prevents interference of the bellows portion with the ear portion of the clamp on the compression side to thereby improve the durability.

(2) On the tension side, the film length of the boot is supplemented by extension of the above-mentioned two small crest portions to relax the tensile stress on the trough portions to thereby alleviate the fatigue of the trough portions.

(3) Further, a curvature radius of a crest portion and a curvature radius of a trough portion, which are closest to the small-diameter-side mounting portion, on a longitudinal cross section are increased to reduce a stiffness. In this manner, a repeated stress due to tension and compression on the periphery of the small-diameter-side mounting portion is reduced.

As technical means for achieving the above-mentioned object, there is provided a boot for a constant velocity universal joint, comprising: a large-diameter-side mounting portion, which is to be mounted on an outer peripheral surface of an outer joint member of the constant velocity universal joint, and is to be fixed to the outer peripheral surface of the outer joint member through fastening with use of a boot clamp; a small-diameter-side mounting portion, which is to be mounted on an outer peripheral surface of a shaft, and is to be fixed to the outer peripheral surface of the shaft through fastening with use of a boot clamp; a bellows portion configured to integrally couple the large-diameter-side mounting portion and the small-diameter-side mounting portion to each other; and a cylindrical shoulder portion, which is formed at the bellows portion-side end of the large-diameter-side mounting portion, and is connected to the bellows portion through two auxiliary crest portions and one auxiliary trough portion between the two auxiliary crest portions, wherein a radial distance H1 between each of the auxiliary crest portions and the auxiliary trough portion is set shorter than a radial distance 112 between a crest portion and a trough portion of the bellows portion, wherein a diameter D1 passing through a center Ho of the radial distance H1 between each of the auxiliary crest portions and the auxiliary trough portion is set larger than a diameter D3 of the cylindrical shoulder portion, and wherein the boot has such a deformation mode that, when the constant velocity universal joint forms a high operating angle, the auxiliary crest portions overlap each other in a radial direction of the boot on the outer peripheral surface of the outer joint member.

With the configuration described above, the boot for a constant velocity universal joint, which has excellent durability and fatigue resistance even when a constant velocity universal joint forms a super high operating angle, can be achieved.

More specifically, it is preferred that curvature radii of the crest portion and the trough portion of the bellows portion, which are closest to the small-diameter-side mounting portion, on a longitudinal cross section be larger than curvature radii of the other crest portions and the other trough portions on the longitudinal cross section. In this manner, the stiffness of the small-diameter-side mounting portion is reduced to enable relaxation of the repeated stress due to tension and compression on the periphery of the small-diameter-side mounting portion.

It is preferred that the cylindrical shoulder portion comprises an arc-shaped portion projecting radially inward from the bellows portion-side end of the large-diameter-side mounting portion and a straight-shaped portion extending in connection to the arc-shaped portion. With the configuration described above, when the cylindrical shoulder portion is subjected to compression, the cylindrical shoulder portion is deformed so as to be warped to a far side opposite to the opening side of the outer joint member to promote overlapping deformation of the auxiliary crest portions in the radial direction.

When the above-mentioned boot for a constant velocity universal joint is made of a thermoplastic polyester-based elastomer, the boot may exert high durability.

Effects of the Invention

According to the present invention, the boot for a constant velocity universal joint, which has excellent durability and fatigue resistance even when a constant velocity universal joint forms a super high operating angle, can be achieved.

BRIEF DESCRIPTION OF DRAWINGS

FIG. 2b is an enlarged longitudinal sectional view of a portion A of FIG. 2a.

FIG. 2c is an enlarged longitudinal sectional view of a portion B of FIG. 2a.

FIG. 6b is an enlarged longitudinal sectional view of a portion C of FIG. 6a.

FIG. 7b is an enlarged longitudinal sectional view of a portion D of FIG. 7a.

EMBODIMENTS OF THE INVENTION

Figure 1:
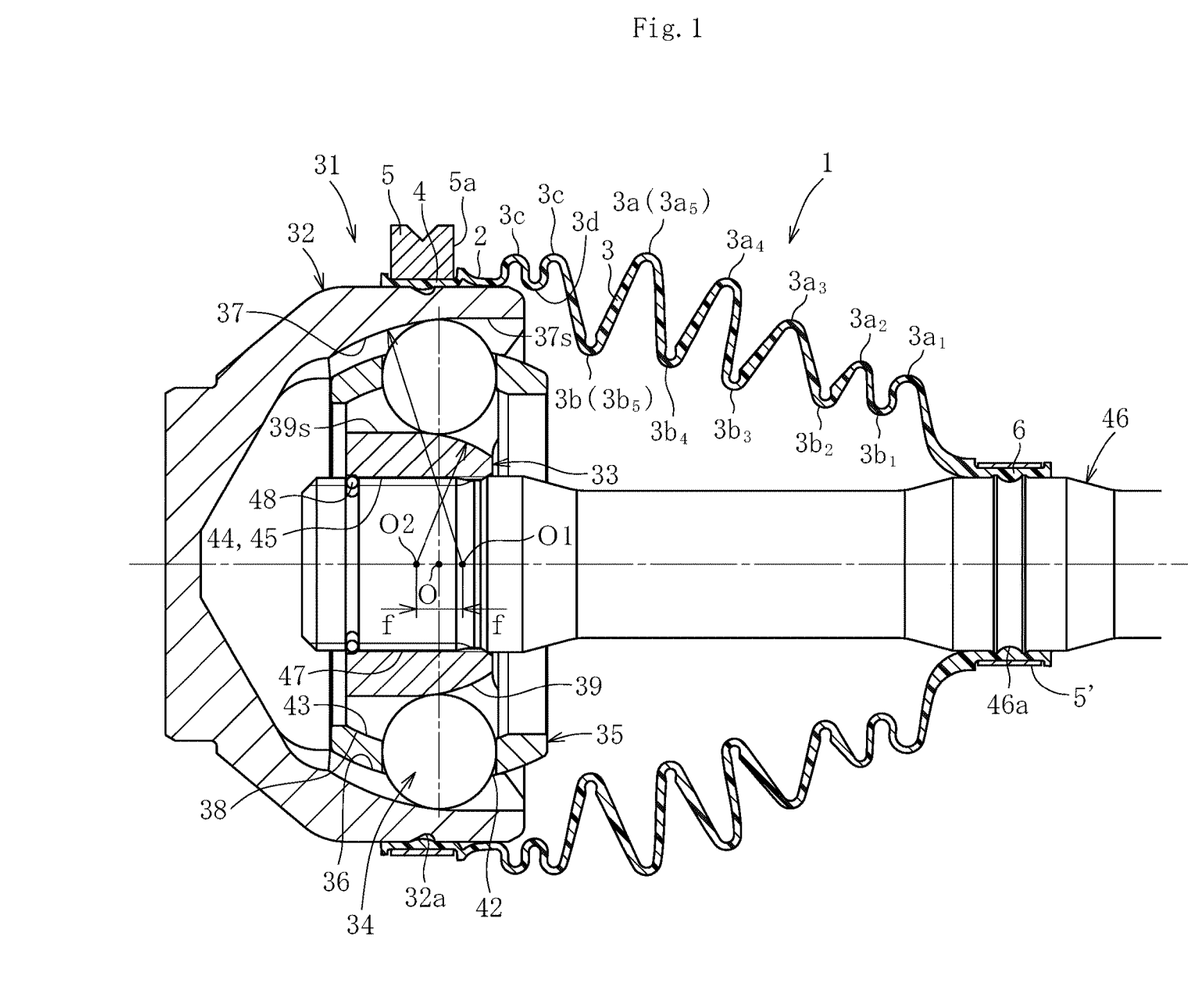
FIG. 1 is a longitudinal sectional view of a constant velocity universal joint to which a boot for a constant velocity universal joint according to a first embodiment of the present invention is mounted.
Figure 2A:
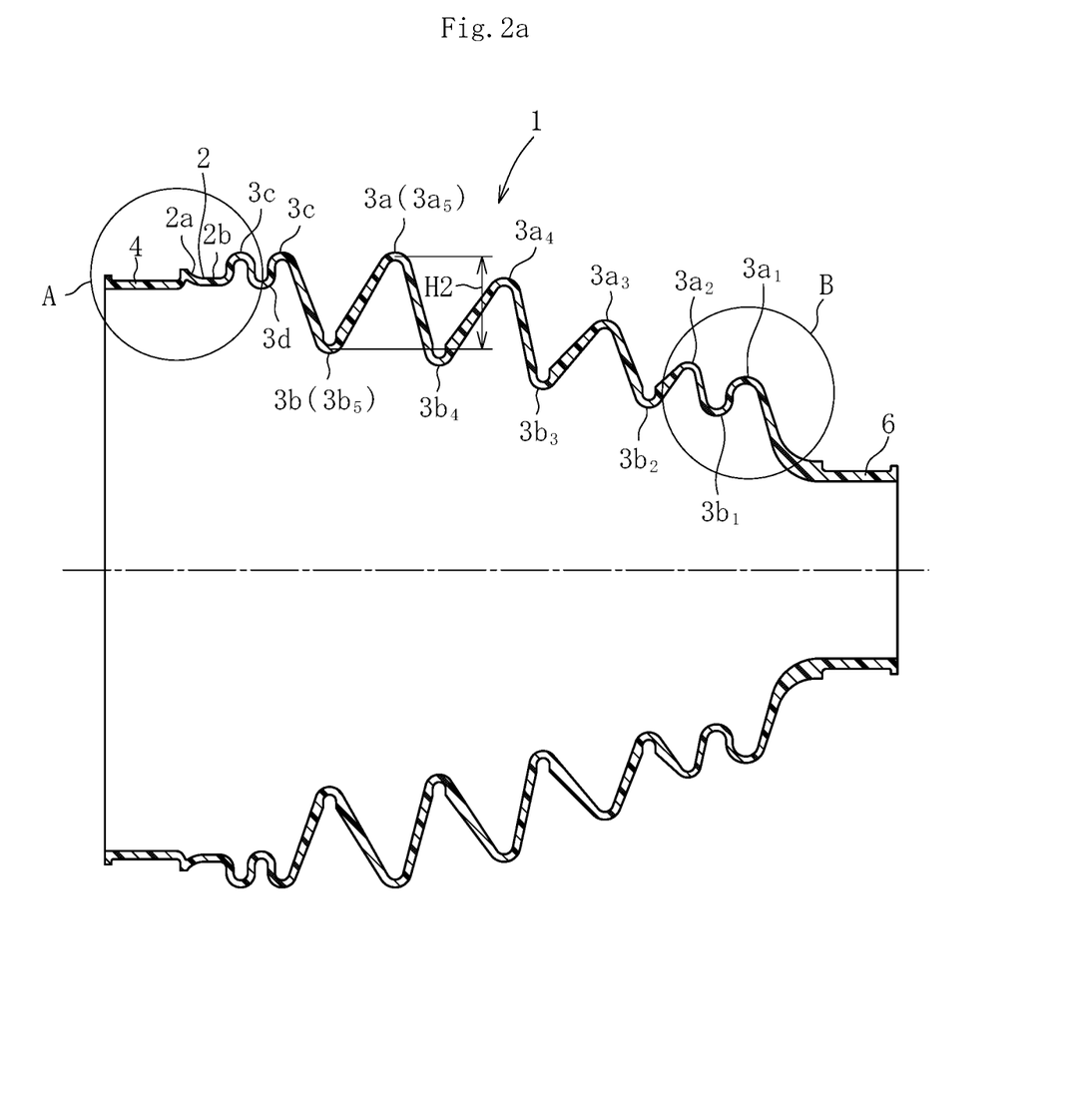
FIG. 2a is a longitudinal sectional view of the boot for a constant velocity universal joint of FIG. 1 alone.
Figure 2B:
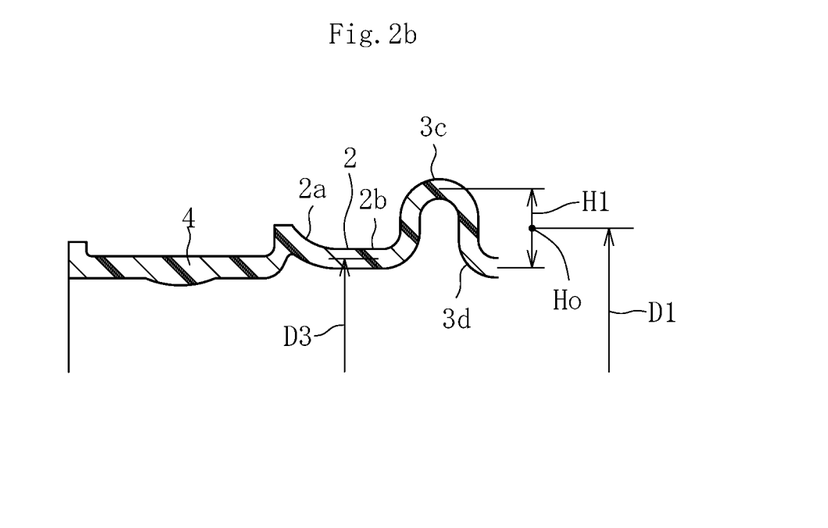
Figure 2C:
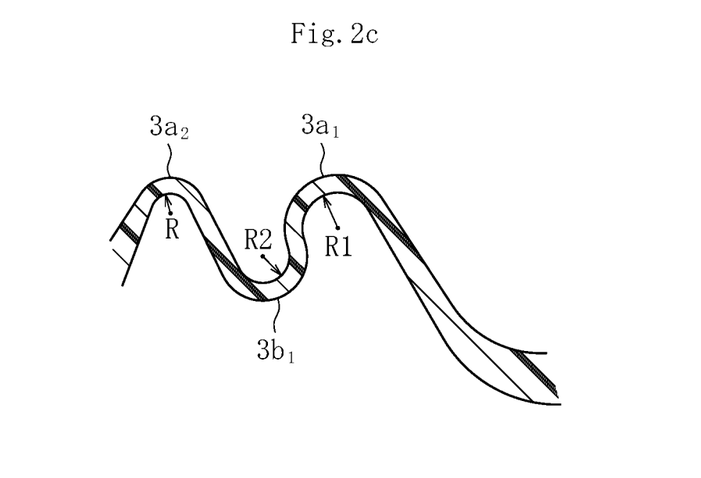
Figure 3:
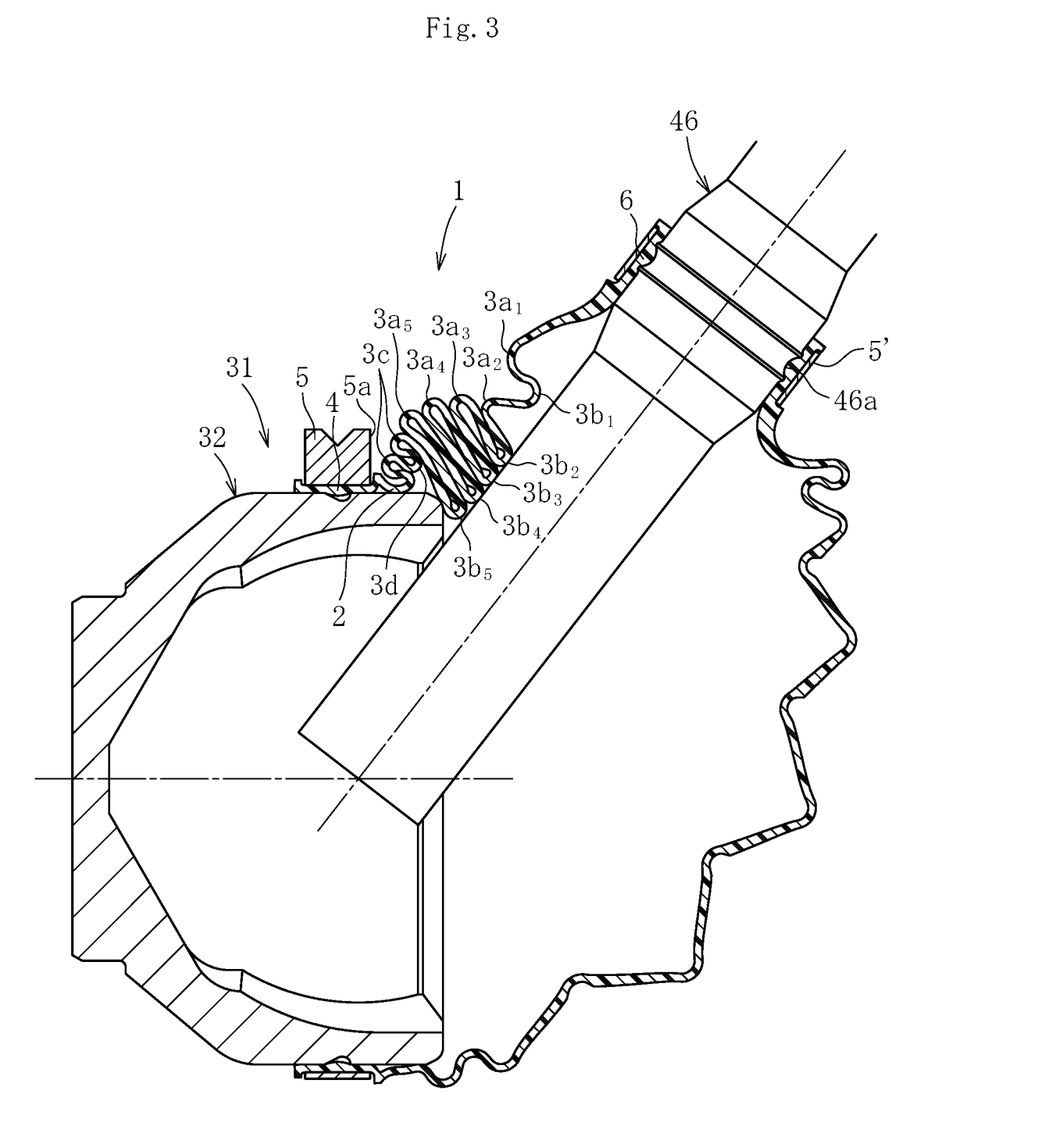
FIG. 3 is a longitudinal sectional view for illustrating a bent state of the boot for a constant velocity universal joint of FIG. 1 when the constant velocity universal joint forms a high operating angle.

A boot for a constant velocity universal joint according to a first embodiment of the present invention is described with reference to FIG. 1 to FIG. 3. FIG. 1 is a longitudinal sectional view of a constant velocity universal joint to which the boot for a constant velocity universal joint according to the first embodiment of the present invention is mounted. FIG. 2a is a longitudinal sectional view of the boot for a constant velocity universal joint of FIG. 1 alone. FIG. 2b is an enlarged longitudinal sectional view of a portion A of FIG. 2a. FIG. 2c is an enlarged longitudinal sectional view of a portion B of FIG. 2a. FIG. 3 is a longitudinal sectional view for illustrating a bent state of the boot for a constant velocity universal joint of FIG. 1 when the constant velocity universal joint forms a high operating angle.

First, an overview of the constant velocity universal joint to which the boot for a constant velocity universal joint of this embodiment is mounted is described with reference to FIG. 1. A constant velocity universal joint 31 is a so-called fixed type undercut-free constant velocity universal joint, and mainly comprises an outer joint member 32, an inner joint member 33, torque transmitting balls 34 (hereinafter also referred to simply as "balls"), and a cage 35. A plurality of track grooves 37 are formed equiangularly on a spherical inner peripheral surface 36 of the outer joint member 32 along an axial direction of the outer joint member 32. Track grooves 39 opposed to the track grooves 37 of the outer joint member 32 are formed equiangularly on a spherical outer peripheral surface 38 of the inner joint member 33 along an axial direction of the inner joint member 33. A plurality of balls 34 configured to transmit a torque are incorporated one by one between the track grooves 37 of the outer joint member 32 and the track grooves 39 of the inner joint member 33. The cage 35 configured to retain the balls 34 is arranged between the spherical inner peripheral surface 36 of the outer joint member 32 and the spherical inner peripheral surface 38 of the inner joint member 33.

Both of a curvature center of a spherical outer peripheral surface 42 of the cage 35, which is fitted inside the spherical inner peripheral surface 36 of the outer joint member 32, and a curvature center of a spherical inner peripheral surface 43 of the cage 35, which is fitted inside the spherical outer peripheral surface 38 of the inner joint member 33, are offset (not shown) by a small amount to the sides opposite to each other in the axial direction with respect to a joint center O. A curvature center O1 of each of the track grooves 37 of the outer joint member 32 and a curvature center O2 of each of the track grooves 39 of the inner joint member 33 are offset by an equal distance "f" in the axial direction on the sides opposite to each other with respect to the joint center O. Each of the track grooves 37 of the outer joint member 32 has a straight portion 37s on an opening side, and each of the track grooves 39 of the inner joint member 33 has a straight portion 39s on a far side opposite to the opening side. With the configuration described above, when the joint forms an operating angle, the balls 34 are always guided to a plane that bisects an angle (operating angle) formed between an axial line of the outer joint member 32 and an axial line of the inner joint member 33. Hence, rotation is transmitted between the two axes at a constant velocity.

The constant velocity universal joint 31 is the fixed type undercut-free constant velocity universal joint having the track grooves 37, each having the straight portion 37s, and the track grooves 39, each having the straight portion 39s, and hence is originally suitable for a high operating angle. Besides, changes in guided state of the balls 34 and retained state of the balls 34 in the track grooves 37 on the opening side of the outer joint member 32 are made so that the constant velocity universal joint 31 can be operated at a super high operating angle equal to or larger than 50 degrees. Details thereof are herein omitted.

Splines (including serrations; the same applies hereinafter) 45 are formed on an inner peripheral surface 44 of the inner joint member 33. Splines 47 of a shaft 46 are fitted to the splines 45, and the shaft 46 is fixed with use of a snap ring 48 in the axial direction.

In FIG. 1, the fixed type undercut-free constant velocity universal joint is exemplified as the constant velocity universal joint 31 capable of operating at a super high operating angle. However, the constant velocity universal joint of the present invention is not limited thereto. Other models of fixed type constant velocity universal joints capable of operating at a super high operating angle in terms of, for example, forms and arrangement of the track grooves of the inner joint member and the outer joint member, and the guided state of the balls and the retained state of the balls in the track grooves on the opening side of the outer joint member may be used. Thus, any model of fixed type constant velocity universal joint may be used.

Next, a boot for a constant velocity universal joint according to this embodiment is described. As illustrated in FIG. 1, a boot for a constant velocity universal joint (hereinafter also referred to simply as "boot") 1 mainly comprises a large-diameter-side mounting portion 4, a small-diameter-side mounting portion 6, and a bellows portion 3. The large-diameter-side mounting portion 4 is mounted to an outer peripheral surface of the outer joint member 32. The small-diameter-side mounting portion 6 is mounted to the shaft 46. The bellows portion 3 is configured to connect the large-diameter-side mounting portion 4 and the small-diameter-side mounting portion 6 to each other. The bellows portion 3 comprises about two to seven crest portions 3a and trough portions 3b between the crest portions 3a.

The large-diameter-side mounting portion 4 of the boot 1 is fitted into a boot mounting groove 32a formed at an outer peripheral surface of the outer joint member 32 and is fixed through fastening with use of a boot clamp 5. The small-diameter-side mounting portion 6 is fitted into a boot mounting groove 46a of the shaft 46 and is fixed through fastening with use of a boot clamp 5'.

As illustrated in FIG. 2a and FIG. 2b, a cylindrical shoulder portion 2 is formed adjacent to a bellows portion-side end of the large-diameter-side mounting portion 4. The cylindrical shoulder portion 2 has an arc-shaped portion 2a and a straight-shaped portion 2b. The arc-shaped portion 2a projects radially inward from the large-diameter-side mounting portion 4 toward the outer peripheral surface of the outer joint member 32. Two small auxiliary crest portions 3c are formed between the straight-shaped portion 2b of the cylindrical shoulder portion 2 and the bellows portion 3. One auxiliary trough portion 3d is formed between the auxiliary crest portions 3c.

The boot 1 is made of a thermoplastic polyester-based elastomer. The boot 1 is made of a thermoplastic polyester-based elastomer having a hardness falling within a range of from 35 to 53, which is measured by a type-D durometer specified in JIS K6253, and hence can exert high durability. The thermoplastic polyester-based elastomer is a material having an intermediate elastic modulus between an elastic modulus of a soft material such as a vulcanized rubber and an elastic modulus of a material having a high stiffness such as a thermoplastic resin. The thermoplastic polyester-based elastomer has features of both of the vulcanized rubber and the thermoplastic resin, and exhibits features such as an elasticity for allowing restoration to an original shape even after deformation, a higher mechanical strength than that of the vulcanized rubber, and applicability of all molding methods, which can be used for a general thermoplastic resin.

As illustrated in FIG. 2b in an enlarged manner, a radial distance between a thickness center of each of the auxiliary crest portions 3c and a thickness center of the auxiliary trough portion 3d is represented by H1, and a center of the radial distance H1 is represented by Ho. A diameter passing through the center Ho is represented by D1. A diameter of the thickness center of the straight-shaped portion 2b of the cylindrical shoulder portion 2 is represented by D3. For the boot 1 of this embodiment, the diameter D1 passing through the center Ho of the radial distance H1 between the thickness center of each of the auxiliary crest portions 3c and the thickness center of the auxiliary trough portion 3d is set larger than the diameter D3 to the thickness center of the straight-shaped portion 2b of the cylindrical shoulder portion 2. The recitation of "the diameter (D1) to the center (Ho) of the radial distance (H1) between each of the auxiliary crest portions and the auxiliary trough portion is set larger than the diameter (D3) of the cylindrical shoulder portion" in Claims has the above-mentioned meaning.

A radial distance between a thickness center of the crest portion 3a and a thickness center of the trough portion 3b of the bellows portion 3 is represented by I12. In FIG. 2a, a radial distance between a thickness center of a first trough portion $3b_5$ and a thickness center of a first crest portion $3a_5$ in a direction from the auxiliary crest portions 3c to the small-diameter side of the boot 1 is illustrated as the radial distance I12. However, the reference sign H2 shall be treated as being used for each of a radial distance between a thickness center of a crest portion $3a_2$ and a thickness center of a trough portion $3b_2$, a radial distance between a thickness center of a crest portion $3a_3$ and a thickness center of a trough portion $3b_3$, and a radial distance between a thickness center of a crest portion $3a4$ and a thickness center of a trough portion $3b_4$, except for a radial distance between a thickness center of a crest portion $3a_1$ and a thickness center of a trough portion $3b_1$, which are closest to the small-diameter-side mounting portion 6. For the boot 1 of this embodiment, the radial distance H1 between the thickness center of each of the auxiliary crest portions 3c and the thickness center of the auxiliary trough portion 3d is set smaller than the radial distance I12 between the thickness center of the crest portion 3a and the thickness center of the trough portion 3b of the bellows portion 3. The recitation of "the radial direction (H1) between each of the auxiliary crest portions and the auxiliary trough portion is set smaller than the radial direction (I12) between the crest portion and the trough portion of the bellows portion" in Claims has the above-mentioned meaning.

A deformed state of the boot 1 having the shape and the dimensional settings described above according to this embodiment when the constant velocity universal joint forms a high operating angle is described with reference to FIG. 3. The boot 1 is placed in the following excellent deformation mode by: (1) the formation of the cylindrical shoulder portion at the bellows portion-side end of the large-diameter-side mounting portion and the connection of the cylindrical shoulder portion to the bellows portion through the two auxiliary crest portions and the one auxiliary trough portion between the auxiliary crest portions; (2) the setting of the radial distance H1 between each of the auxiliary crest portions and the auxiliary trough portion shorter than the radial distance I12 between the crest portion and the trough portion of the bellows portion; and (3) the setting of the diameter D1 passing through the center Ho of the radial distance H1 between each of the auxiliary crest portions and the auxiliary trough portion larger than the diameter D3 of the cylindrical shoulder portion.

More specifically, the boot 1 has such a deformation mode that the two auxiliary crest portions 3c overlap each other in the radial direction on the outer peripheral surface of the outer joint member 32 with an end of the straight-shaped portion 2b of the cylindrical shoulder portion 2 as a fulcrum. In this manner, tilt of the bellows portion 3 to a far side of the outer joint member 32 is prevented to thereby prevent interference of the bellows portion 3 with an ear portion 5a of the boot clamp 5. The cylindrical shoulder portion 2 has the arc-shaped portion 2a, which projects radially inward from the large-diameter-side mounting portion 4 toward the outer peripheral surface of the outer joint member 32, and the straight-shaped portion 2b. Thus, when the cylindrical shoulder portion 2 is subjected to compression, the cylindrical shoulder portion 2 is deformed in a warped manner toward the far side of the outer joint portion 32. In this manner, the overlapping deformation of the auxiliary crest portions 3c in the radial direction is promoted. The overlapping deformation of the auxiliary crest portions 3c in the radial direction is started at the operating angle of about 45 degrees.

As described above, a compression side of the bellows portion 3 is prevented from interfering with the ear portion 5a of the boot clamp 5 to enable improvement of the durability. The bellows portion 3 is folded in an excellent manner owing to such a deformation mode that the auxiliary crest portions 3c overlap each other in the radial direction. As a result, a stress on the crest portions 3a and the trough portions 3b on the compression side can be relaxed. Further, on a tension side, the two auxiliary crest portions 3c are stretched to supplement the film length of the boot 1. As a result, a tensile stress on the trough portions 3b is relaxed to enable alleviation of fatigue of the trough portions 3b.

In this embodiment, the boot clamp 5 is illustrated based on the assumption that an ear clamp having the ear portion 5a for caulking is used. However, for example, a lever-type clamp or a low profile clamp may be used, and any shape specifications may be used.

A more advantageous configuration of the boot 1 of this embodiment is described with reference to FIG. 2a and FIG. 2c. Curvature radii R1 and R2 of the crest portion $3a_1$ and the trough portion $3b_1$, which are closest to the small-diameter-side mounting portion 6, are set larger than curvature radii R of the other crest portions $3a_2$, $3a_3$, $3a_4$, and $3a_5$ and the other trough portions $3b_2$, $3b_3$, $3b_4$, and $3b_5$. With the setting described above, a stiffness of the small-diameter-side mounting portion 6 is reduced so that the small-diameter-side mounting portion 6 can flexibly follow an inclination of the shaft 46 (see FIG. 3), and a repeated stress due to tension and compression on the peripheral portion of the small-diameter-side mounting portion 6 is relaxed. It is preferred that the curvature radius R1 of the crest portion $3a_1$ and the curvature radius R2 of the trough portion $3b_1$ be set larger than 2 mm and equal to or smaller than 4 mm. A lower limit of 2 mm for each of the curvature radii R1 and R2 is set to be larger than 2 mm, which is a curvature radius of an existing boot for a constant velocity universal joint, to reduce the stiffness of the small-diameter-side mounting portion 6 so as to relax the stress on the peripheral portion of the small-diameter-side mounting portion 6. Meanwhile, an upper limit of 4 mm for the each of the curvature radii R1 and R2 is set so as to prevent increase in size of the boot itself in the axial direction.

With a combination of the above-mentioned shape and dimensional settings, the boot 1 of this embodiment can be achieved as a boot for a constant velocity universal joint, which has excellent durability and fatigue resistance even when the constant velocity universal joint forms a super high operating angle.

Figure 4:
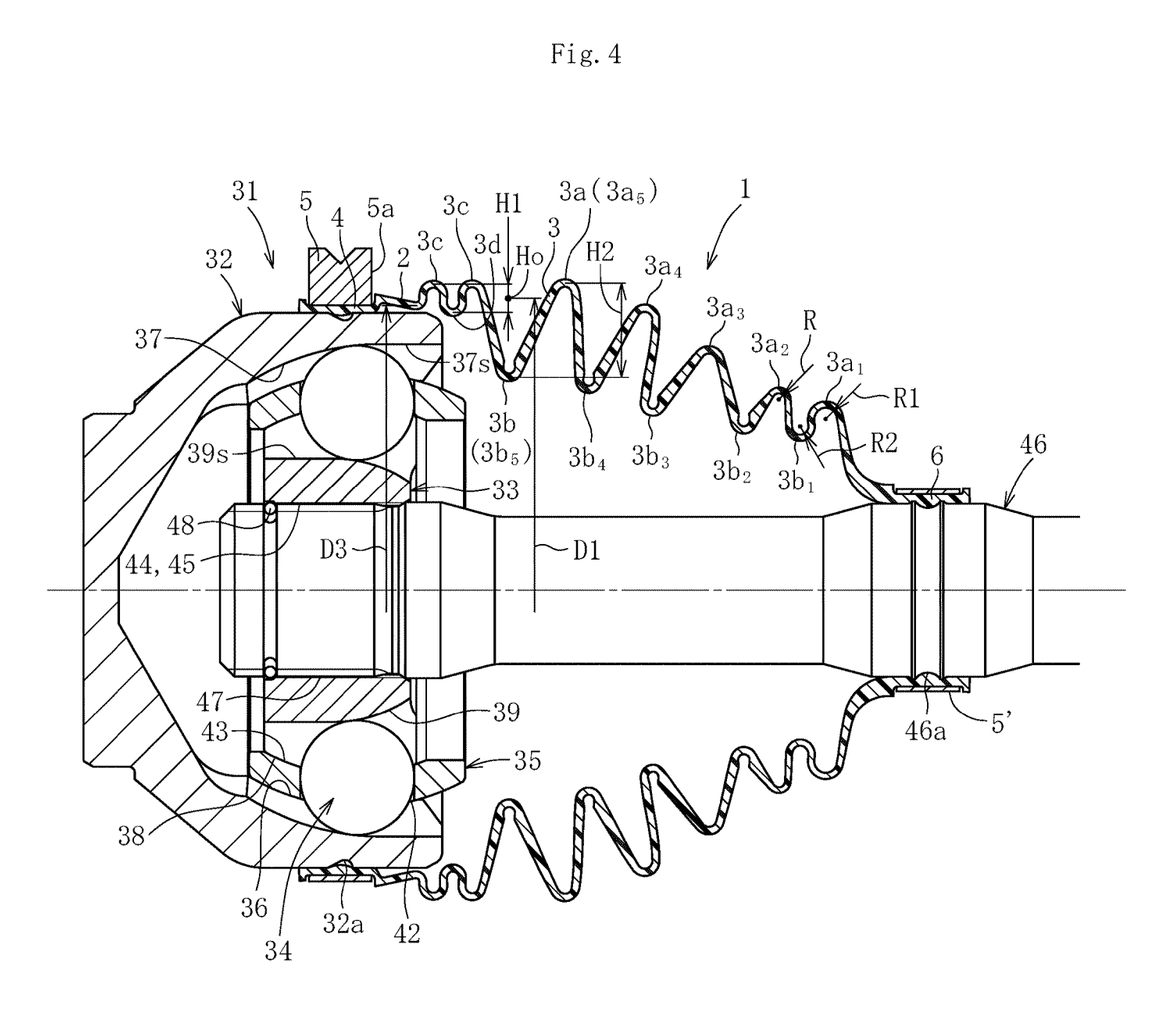
FIG. 4 is a longitudinal sectional view for illustrating a boot for a constant velocity universal joint according to a second embodiment of the present invention.
Figure 5:
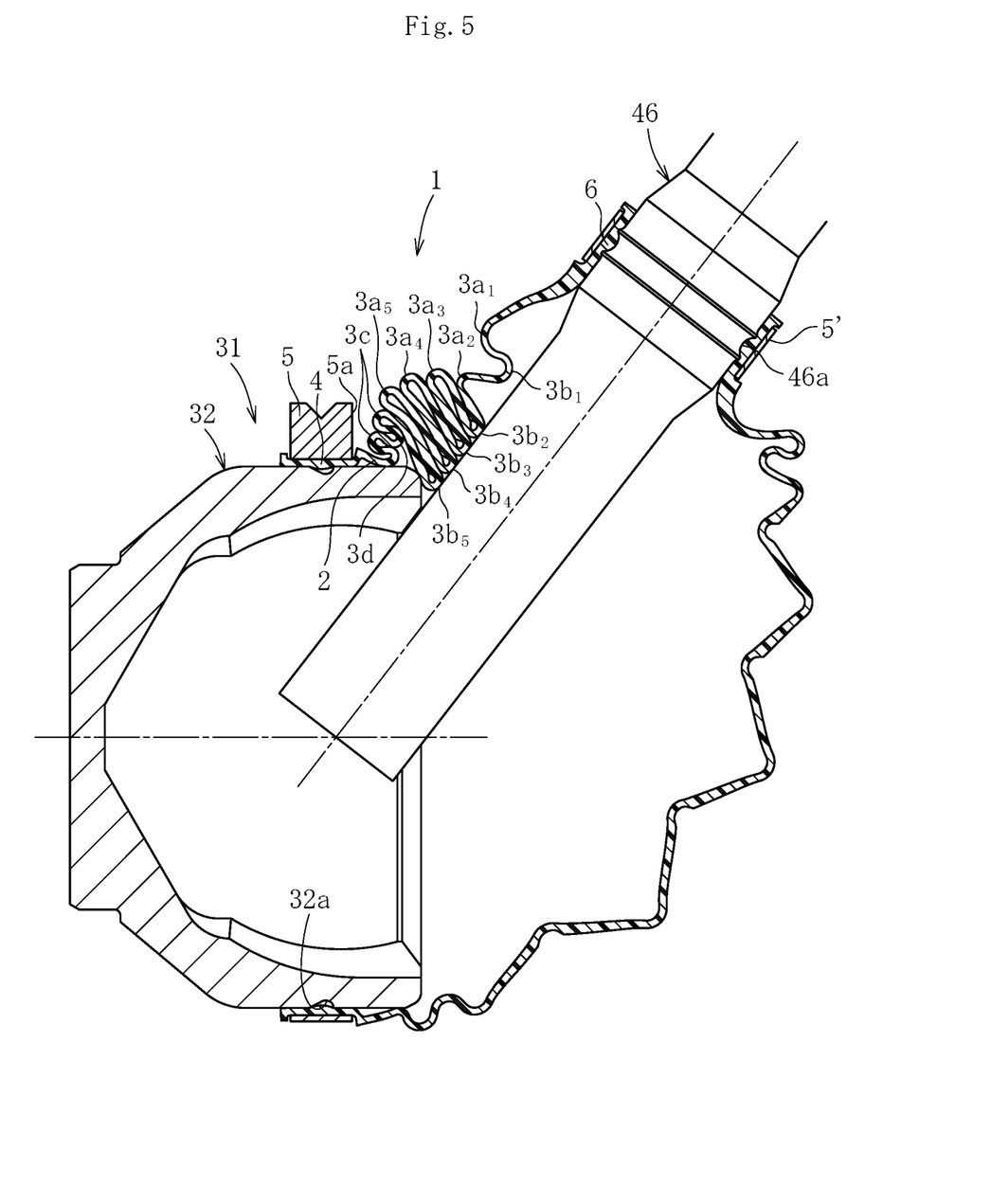
FIG. 5 is a longitudinal sectional view for illustrating a bent state of the boot for a constant velocity universal joint of FIG. 4 when the constant velocity universal joint forms a high operating angle.

Next, a boot for a constant velocity universal joint according to a second embodiment of the present invention is described with reference to FIG. 4 and FIG. 5. FIG. 4 is a longitudinal sectional view for illustrating a boot for a constant velocity universal joint according to this embodiment. FIG. 5 is a longitudinal sectional view for illustrating a bent state of the boot for a constant velocity universal joint of FIG. 4 when the constant velocity universal joint forms a high operating angle. The boot for a constant velocity universal joint according to this embodiment differs from that according to the first embodiment in the shape of the cylindrical shoulder portion. The other configurations are the same as those of the first embodiment. Thus, the same portions and members having the same functions as those of the first embodiment are denoted by the same reference symbols, and only essential points are described.

As illustrated in FIG. 4, in the boot 1 for a constant velocity universal joint according to this embodiment, the cylindrical shoulder portion 2 adjacent to the bellows portion-side end of the large-diameter-side mounting portion 4 has a tapered shape with a diameter decreasing toward the small-diameter side. Two small auxiliary crest portions 3c are formed between the small-diameter-side end of the cylindrical shoulder portion 2 and the bellows portion 3. One auxiliary trough portion 3d is formed between the auxiliary crest portions 3c.

Even for the boot 1 for a constant velocity universal joint according to this embodiment, a radial distance between a thickness center of each of the auxiliary crest portions 3c and a thickness center of the auxiliary trough portion 3d is represented by H1, and a center of the radial distance H1 is represented by Ho. A diameter passing through the center Ho is represented by D1. A diameter at a thickness center of a reduced-thickness end of the tapered shape of the cylindrical shoulder portion 2 is represented by D3. The diameter D1 passing through the center Ho of the radial distance H1 between the thickness center of each of the auxiliary crest portions 3c and the thickness center of the auxiliary trough portion 3d is set larger than the diameter D3 to the thickness center of the reduced thickness end of the tapered shape of the cylindrical shoulder portion 2.

A radial distance between a thickness center of the crest portion 3a and a thickness center of the trough portion 3b of the bellows portion 3 is represented by H2. Even in the boot 1 of this embodiment, the radial distance H1 between the thickness center of each of the auxiliary crest portions 3c and the thickness center of the auxiliary trough portion 3d is set shorter than the radial distance H2 between the thickness center of the crest portion 3a and the thickness center of the trough portion 3b of the bellows portion 3.

With the above-mentioned shape and dimensional settings, the two auxiliary crest portions 3c are deformed so as to overlap each other in the radial direction on the outer peripheral surface of the outer joint member 32 with the end of the cylindrical portion of the shoulder portion 2 as a fulcrum. As a result, the interference of the compression side of the bellows portion 3 with the ear portion 5a of the boot clamp 5 can be prevented to enable the improvement of the durability. Further, on the tension side, the two auxiliary crest portions 3c are stretched to supplement the film length of the boot 1. As a result, the tensile stress on the trough portions 3b is relaxed to enable alleviation of fatigue of the trough portions 3b.

Further, the curvature radii R1 and R2 of the crest portion $3a_1$ and the trough portion $3b_1$, which are closest to the small-diameter-side mounting portion 6, are set larger than the curvature radii R of the other crest portions $3a_2$, $3a_3$, $3a_4$, and $3a_5$ and the other trough portions $3b_2$, $3b_3$, $3b_4$, and $3b_5$. With this setting, the stiffness of the small-diameter-side mounting portion 6 is reduced to relax the stress on the peripheral portion of the small-diameter-side mounting portion 6.

The other configurations are the same as those of the above-mentioned boot for a constant velocity universal joint according to the first embodiment. Thus, the description given above is used to herein omit the description of the other configurations. With the combination of the above-mentioned shape and dimensional settings, even the boot 1 of this embodiment can be achieved as a boot for a constant velocity universal joint, which has excellent durability and fatigue resistance even when the constant velocity universal joint forms a super high operating angle.

The present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

DESCRIPTION OF REFERENCE SIGNS 1 boot for constant velocity universal joint
2 cylindrical shoulder portion 2a arc-shaped portion
2b straight-shaped portion
3 bellows portion
3a crest portion
3b trough portion
3c auxiliary crest portion
3d auxiliary trough portion
4 large-diameter-side mounting portion
5 boot clamp
5a ear portion
6 small-diameter-side mounting portion
31 constant velocity universal joint
32 outer joint member
33 inner joint member
34 ball
35 cage
46 shaft
D1 diameter
D3 diameter
H1 radial distance
H2 radial distance
Ho center

The invention claimed is:

1. A boot for a constant velocity universal joint, the boot comprising:
   a large-diameter-side mounting portion, which is to be mounted on an outer peripheral surface of an outer joint member of the constant velocity universal joint, and is to be fixed to the outer peripheral surface of the outer joint member through fastening with use of a boot clamp;
   a small-diameter-side mounting portion, which is to be mounted on an outer peripheral surface of a shaft, and is to be fixed to the outer peripheral surface of the shaft through fastening with use of a boot clamp;
   a bellows portion configured to integrally couple the large-diameter-side mounting portion and the small-diameter-side mounting portion to each other; and
   a cylindrical shoulder portion, which is formed at a bellows portion-side end of the large-diameter-side mounting portion, and is connected to the bellows portion through only two auxiliary crest portions and only one auxiliary trough portion between the only two auxiliary crest portions,
   wherein one of the only two auxiliary crest portions on a bellows side is connected to an axial end of a bellows of the bellows portion axially closest to the large-diameter-side mounting portion, and another of the two auxiliary crest portions is connected to the cylindrical shoulder portion,
   wherein a radial distance (H1) between a thickness center of each of the auxiliary crest portions and a thickness center of the auxiliary trough portion is set shorter than a radial distance (H2) between a crest portion and a trough portion of the bellows portion other than a crest portion and a trough portion of the bellows portion closest to the small-diameter-side mounting portion,
   wherein a diameter (D1) passing through a center (Ho) of the radial distance (H1) between the thickness center of each of the auxiliary crest portions and the thickness center of the auxiliary trough portion is set larger than a diameter (D3) of the cylindrical shoulder portion, and
   wherein the boot has such a deformation mode that, when the constant velocity universal joint forms a high operating angle, the auxiliary crest portions overlap each other in a radial direction of the boot on the outer peripheral surface of the outer joint member such that the boot is configured to handle an operating angle equal to or greater than 50 degrees.

2. The boot for a constant velocity universal joint according to claim 1, wherein curvature radii of the crest portion and the trough portion of the bellows portion, which are closest to the small-diameter-side mounting portion, on a longitudinal cross section are larger than curvature radii of other crest portions and other trough portions on the longitudinal cross section.

3. The boot for a constant velocity universal joint according to claim 1, wherein the cylindrical shoulder portion comprises an arc-shaped portion projecting radially inward from the bellows portion-side end of the large-diameter-side mounting portion and a straight-shaped portion extending in connection to the arc-shaped portion.

4. The boot for a constant velocity universal joint according to claim 1, wherein the boot for a constant velocity universal joint is made of a thermoplastic polyester-based elastomer.

5. The boot for a constant velocity universal joint according to claim 2, wherein the cylindrical shoulder portion comprises an arc-shaped portion projecting radially inward from the bellows portion-side end of the large-diameter-side mounting portion and a straight-shaped portion extending in connection to the arc-shaped portion.

6. The boot for a constant velocity universal joint according to claim 2, wherein the boot for a constant velocity universal joint is made of a thermoplastic polyester-based elastomer.

7. The boot for a constant velocity universal joint according to claim 3, wherein the boot for a constant velocity universal joint is made of a thermoplastic polyester-based elastomer.

8. The boot for a constant velocity universal joint according to claim 5, wherein the boot for a constant velocity universal joint is made of a thermoplastic polyester-based elastomer.

* * * * *